United States Patent [19]

Sano et al.

[11] Patent Number: 5,184,239
[45] Date of Patent: Feb. 2, 1993

[54] SEALING STRUCTURE OF LIQUID CRYSTAL INJECTION HOLES IN LIQUID CRYSTAL DISPLAY DEVICE

[75] Inventors: Kazuyoshi Sano, Ebina; Koh Fujimura, Hino; Takumi Suzuki; Takashi Tsutsui, both of Atsugi, all of Japan

[73] Assignee: Ricoh Company, Ltd., Tokyo, Japan

[21] Appl. No.: 743,076

[22] Filed: Aug. 9, 1991

[30] Foreign Application Priority Data

Aug. 10, 1990 [JP] Japan .................................. 2-210260

[51] Int. Cl.$^5$ .................................................. G02F 1/13
[52] U.S. Cl. ........................................................ 359/80
[58] Field of Search .................................... 359/80, 62

[56] References Cited

U.S. PATENT DOCUMENTS

| | | | |
|---|---|---|---|
| 3,799,649 | 3/1974 | Carlyle | 359/80 |
| 3,871,746 | 3/1975 | Muto et al. | 359/80 |
| 3,926,502 | 12/1975 | Tanaka et al. | 359/80 |
| 3,990,782 | 11/1976 | Yamasaki | 359/80 |
| 4,095,876 | 6/1978 | Horsting et al. | 359/80 |
| 4,443,063 | 4/1984 | Nishiyama | 359/80 |
| 5,037,185 | 8/1991 | Grupp | 359/80 |

FOREIGN PATENT DOCUMENTS

| | | | |
|---|---|---|---|
| 0107753 | 8/1979 | Japan | 359/80 |
| 0145159 | 11/1979 | Japan | 359/80 |
| 0133925 | 6/1986 | Japan | 359/80 |
| 0210913 | 9/1988 | Japan | 359/80 |
| 0313125 | 12/1988 | Japan | 359/80 |
| 0310528 | 12/1990 | Japan | 359/80 |

*Primary Examiner*—William L. Sikes
*Assistant Examiner*—Huy K. Mai
*Attorney, Agent, or Firm*—Oblon, Spivak, McClelland, Maier & Neustadt

[57] ABSTRACT

A sealing structure of a liquid crystal injection holes in a liquid crystal display device, capable of injecting the liquid crystal from a plurality of liquid crystal injection holes into the inside of a liquid crystal cell enclosed by a sealant. The sealing structure of the liquid crystal injection holes is constructed so that each liquid crystal injection holes is linked by a drain of a sealant one to another, and the sealant has an opening portion which connects the inside of the cell with the outside, thus, making it possible to seal all the injection holes by filling the aforementioned drain with the sealing agent which is injected from one of the injection holes.

7 Claims, 4 Drawing Sheets

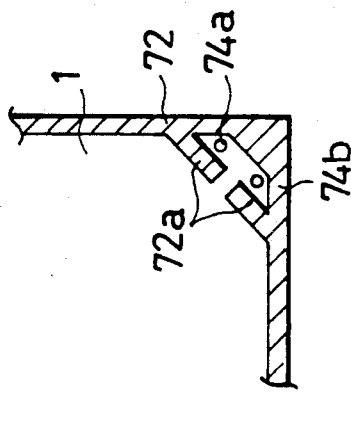
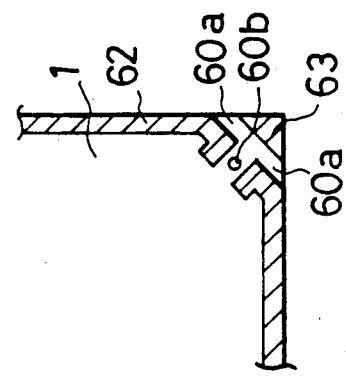
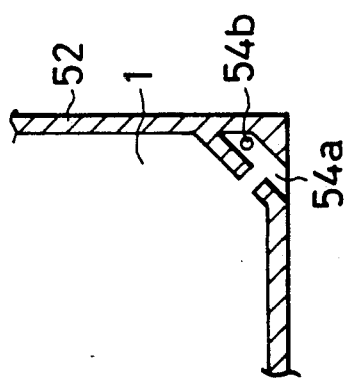
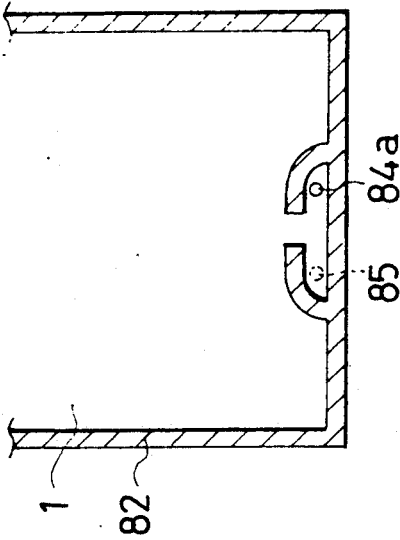
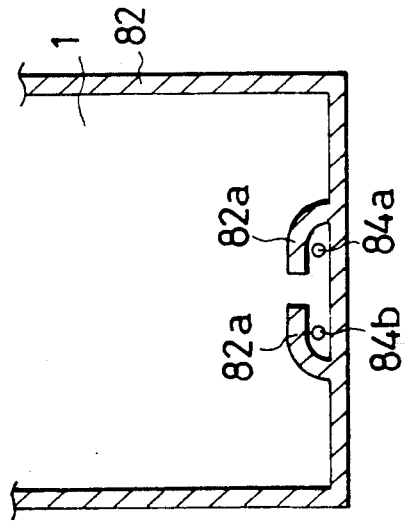

SEALING STRUCTURE OF LIQUID CRYSTAL INJECTION HOLES IN LIQUID CRYSTAL DISPLAY DEVICE

BACKGROUND OF THE INVENTION

1. Field of the Invention

This invention relates to a sealing structure of liquid crystal injection holes in a liquid crystal display device, particularly, to a sealing structure of the liquid crystal injection holes in the liquid crystal display device having a plurality of liquid crystal injection holes.

2. Description of the Related Art

In recent years, the uses of the liquid crystal display devices have been developed as display means for personal equipments and the like in various fields, and there is now a great demand for the liquid crystal display devices for the purpose of large scale displays.

In general, such a liquid crystal display device is manufactured as a display by connecting external electrodes to a liquid crystal cell and overlapping with needed polarizing plates.

On the other hand, the liquid crystal cell is manufactured by the procedures comprising the steps of forming transparent electrodes to be needed on an opposing inner surfaces of the upper and lower substrates made of glass or polymer films, printing an orienting agent or film on the surfaces formed with the transparent electrode and subjecting the resultant to a rubbing treatment thereon, generally, scattering bead-like plastic spacers having a diameter of about 10 μm onto one of the inner surfaces of the upper and lower substrates while forming on the other of the inner surfaces a sealant of the flexible epoxy resin adhesive by screen printing, overlapping the upper substrate and the lower substrate with each other thereby to harden the sealant at a predetermined temperature, letting an air inside the cell out in the quasi-vacuum, and then filling the liquid crystal with the help of the atmospheric pressure from the liquid crystal injection holes provided in the cell by immersing the portion in which the holes are disposed, and sealing the liquid crystal injection hole with the sealing agent after the completion of filling.

In this case, if there is only one hole for injecting the liquid crystal, it requires a lot of time to fill the liquid crystal when the liquid crystal cell to be filled is large-scaled. Therefore, as is shown in FIG. 1 and FIG. 2, for example, there are provided a plurality of liquid crystal injection holes in such a manner that a pair of opening portion indicated as liquid crystal injection holes 134 are provided on sealant 132 of an end face of the cell, or in such a manner that a pair of holes as indicated as liquid crystal injection holes 144 are made on an end portion of either of the upper or lower substrate. After completion of filling the liquid crystal through respective injection holes, the liquid crystal cell is to be finished up by sealing the liquid crystal injection holes as to be the opening portions of a sealant 152 with a sealing agent 156 as shown in FIG. 3.

Now, in recent years, there have been an increasing demand for the liquid crystal display devices in various art fields, and the liquid crystal display devices are requested, to have performances endurable under circumstances applied in various conditions, as well as to be manufactured in low costs. However, the method by which a plurality of the liquid crystal injection holes are sealed individually, increasing the processing steps, can not achieve a reduction in cost. Furthermore, the sealing structure as shown in FIG. 3 sometimes gives rise to a problem in the quality of the liquid crystal display device.

In order to increase the reliability for sealing of the liquid crystal cell, as shown in FIG. 4, it is necessary to make the contact area of the sealing agent with the sealant of the cell as large as possible, or to inject the sealing agent into the cell as much as possible so as to resist and withstand the pressure of the liquid crystal caused in the cell by the external forces such as the pressing force and bending force exerted on the cell, or by change in temperature (refer to FIG. 5). However, the enlargement of the contact area by making the width of the sealing agent larger is restricted due to limitation of printing properties of the sealing agent or due to dimensional limit in design of the cell. Further, it is not easy to inject much sealing agent into the cell due to the pressure of the liquid crystal inside the cell, and even if sufficient sealing agent can be injected, since there is no escape for the liquid crystal in the cell, the caused pressure possibly makes the cell gap uneven, thus giving rise to the lack of the reliability in respect to the cell quality.

SUMMARY OF THE INVENTION

An object of the present invention is to provide a sealing structure of liquid crystal injection holes in a liquid crystal display device, the structure which enables a plurality of liquid crystal injection holes to be easily sealed at a single site with a high reliability.

The object of the invention can be achieved by a sealing structure of liquid crystal injection holes in a liquid crystal display device comprising a plurality of liquid crystal injection holes for injecting a liquid crystal into a liquid crystal cell inside enclosed by a sealant, a drain disposed in the sealant for communicating a plurality of the liquid crystal injection holes to each other, at least one opening portion disposed in the sealant for communicating the drain with the cell inside, and a sealing agent injected from one of the injection holes for sealing a plurality of the injection holes and the drain.

According to the present invention, since respective liquid crystal injection holes are connected one to another by a drain disposed in a sealant, when a sealing agent is injected from one of the liquid crystal injection holes after completion of the injection of the liquid crystal, the sealing agent penetrates toward the other liquid crystal injection holes through the drain of sealant. Thereafter, when the injection of the sealing agent is stopped just before the sealing agent overflows from the other liquid crystal injection holes, the injected sealing agent fills the drain shaped by the sealant so as to seal all the liquid crystal injection holes as well as to make a large contact area with the sealant. As a result, the following effects can be obtained. At first, it is possible to seal all the holes for the liquid crystal simultaneously by sealing only one injection hole for the liquid crystal. Since the injection of the sealing agent injected from one hole liquid crystal hole is stopped just before the sealing agent comes up from the other holes for the liquid crystal, it is possible to control the amount of the sealing agent to be injected by visual observation, thus improving productivity. The excessive sealing agent doesn't come and remain outside the cell, so that there is shown no bad influence on the external form and the like of the cell, and consequently, it possible to obtain a cell advantageous to designing products and having a good appearance. Since all the injection holes for the liquid crystal are communicated so as not to force the liquid crystal to be pushed in by the injection of the sealing agent, it is possible to get a cell having uniform gaps. The sealant contacts with the sealing agent in a large area, and is arranged in such a formation to block the sealing agent, and consequently the sealing agent is hard to come off, thus making it possible to achieve a high reliability.

Further objects and advantages of the present invention will be apparent from the following description of the preferred embodiments of the invention as illustrated in the accompanying drawings.

BRIEF DESCRIPTION OF THE DRAWINGS

FIGS. 10 through 15 are partly diagrammatic sectional views illustrating respectively embodiments in which the injection hole or holes for the liquid crystal are provided on a cell substrate;

DESCRIPTION OF THE PREFERRED EMBODIMENTS

There will be hereinafter made an explanation on the embodiments of the present invention with reference to the drawings.

Figure 1:
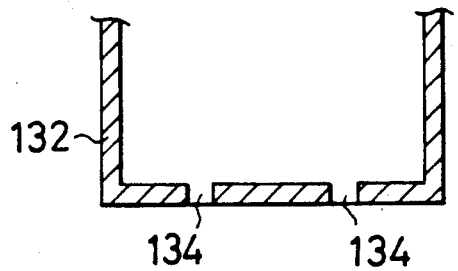
FIG. 1 and FIG. 2 are partly diagrammatic sectional views illustrating liquid crystal injection holes of liquid crystal display devices respectively.
Figure 2:
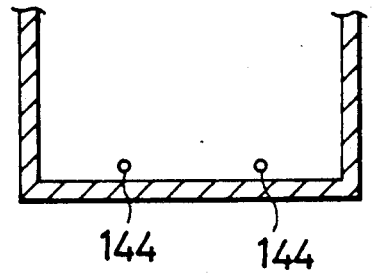
Figure 3:
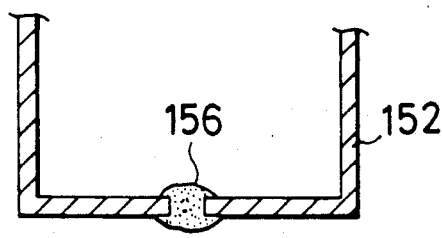
FIG. 3 is a partly diagrammatic sectional view showing the state in which the injection hole for the liquid crystal is sealed with the sealing agent.
Figure 4:
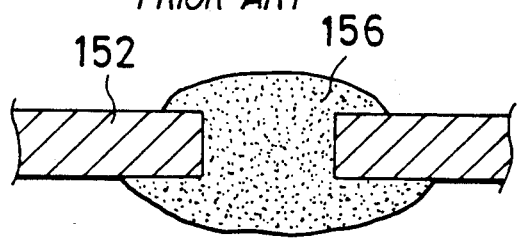
FIG. 4 is an enlarged view showing the state in which the injection hole for the liquid crystal is sealed with the sealing agent.
Figure 5:
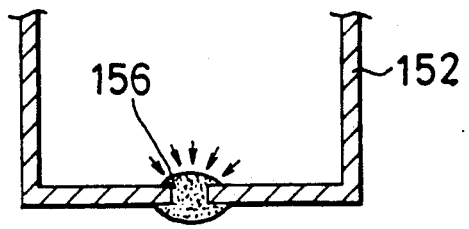
FIG. 5 is a partly diagrammatic sectional view showing the state of the pressure exerted on the sealing agent from within the cell.
Figure 6A:
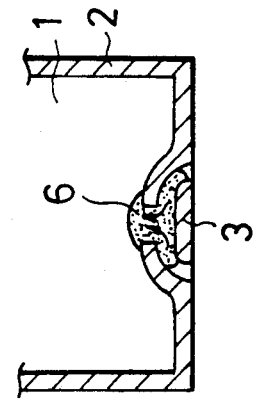
FIGS. 6a, 6b and 6c are partly diagrammatic sectional views illustrating a first embodiment of the sealing structure of the liquid crystal injection holes in the liquid crystal display device according to the present invention.

FIG. 6a shows a first embodiment of the sealing structure of the liquid crystal injection holes of the liquid crystal display device according to the present invention.

In this embodiment, uniaxially oriented polyethylene terephthalate films are used for upper and lower substrates constituting a liquid crystal display device. On each inner, or opposing side of an upper substrate and lower substrates, there is formed a transparent ITO electrode, on which, in turn, an orienting film is printed with being subjected to the rubbing process.

As shown in FIG. 6a, there is printed a sealant of a flexible epoxy resin adhesive on one of the inner surfaces of the substrates. The printed portion with the sealant is constructed of an outer seal portion 2 and a block seal portion 3. The outer seal portion 2 is shaped and arranged along the edge of the substrate 1 so as to enclose the inside of the substrate 1, shaping by part thereof bended portions 2a and 2b which bend toward the inside of the substrate 1. There is an open space between the ends of the bending portions 2a and 2b to form an opening portion 5.

On the other hand, the block seal portion 3 is disposed along the edge of the substrate 1 in the position adjacent to the outer side of the opening portion 5. By one end of the block seal portion 3 and an end of one bended portion 2a, a right-hand liquid crystal injection hole 4a is defined while a left-hand liquid crystal injection hole 4b is defined by the other end of the block seal portion 3 and an end of the other bended portion 2b. With this arrangement, the right-hand liquid crystal injection hole 4a is communicated with the left-hand liquid crystal injection hole 4b through the drain shaped by the block seal portion 3 and the bended portions 2a and 2b each of which are made from sealant.

The substrate so arranged is put upon another substrate to be hardened at a predetermined temperature or with the help of the ultraviolet rays, or etc., thus completing a liquid crystal cell.

Figure 6B:
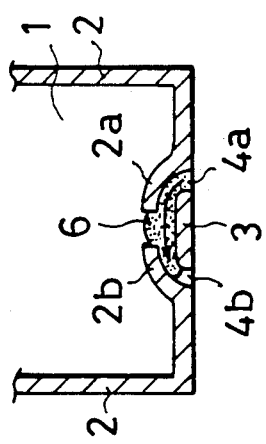
Figure 6C:
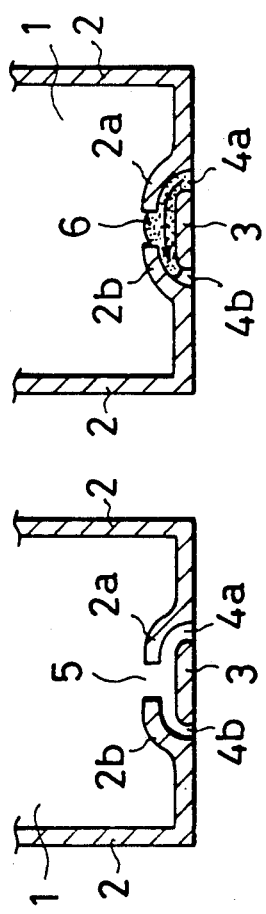

The liquid crystal cell is filled up with the liquid crystal from the right- and left-hand liquid crystal injection holes 4a and 4b thereof, and thereafter while a sealing agent 6 is injected from either the right-hand liquid crystal injection hole 4a or the left-hand liquid crystal injection hole 4b, the sealing agent 6 moves forward, as shown in FIG. 6b, through the drain shaped by the bended portion 2a of the outer seal portion 2 and the block seal portion 3. As a result, a part of the sealing agent 6 is likely to enter the cell through the opening portion 5, and the rest goes through the drain shaped by the bended portion 2b and the block seal portion 3 toward the left-hand liquid crystal injection hole 4b or the right-hand liquid crystal injection hole 4a. The injection of the sealing agent 6 is stopped as soon as the tip of the sealing agent reaches the left-hand liquid crystal injection hole 4b or the right-hand liquid crystal injection hole 4a, and the cell is left alone for a while, then the sealing agent 6 which, partly penetrating into the cell, has filled the drain shaped by the bended portions 2a and 2b of the outer seal portion 2 and the block seal portion 3, becomes hard to form a sealing structure as shown in FIG. 6c.

Accordingly, even when there are two injection holes for the liquid crystal, if one of the holes is sealed, simultaneously the other can be sealed. Since the injection of the sealing agent 6 from the right-hand liquid crystal hole 4a can be stopped just before the sealing agent 6 coming out of the left-hand liquid crystal injection hole 4b, it is possible to make a good use of, or no waste of, the sealing agent 6, thus resulting in the manufacturing cost being reduced. On the other hand, since there is realized a sealing structure which has an extremely large contact area between the sealant and the sealing agent 6, the sealing agent 6 is hard to come off, thus resulting in a sufficient reliability for sealing. Since the amount of the sealing agent 6 to enter the cell from the opening portion 5 is so small that the quantity of the liquid crystal to be pushed in is also small, the injection of sealing agent has no influence upon the gap thickness of the cell. Furthermore, the sealing agent 6 is put inside the cell without jutting outside, so that it is possible to obtain a liquid crystal cell having a good appearance.

Figure 7:
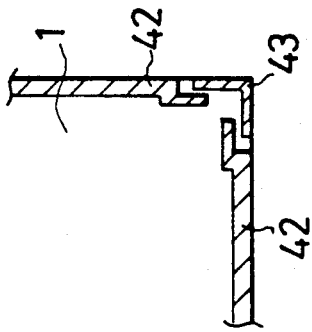
FIGS. 7, 8 and 9 are partly diagrammatic sectional views illustrating transformed examples of the embodiment shown in FIGS. 6a, 6b and 6c, respectively.
Figure 8:
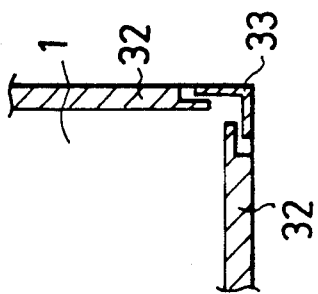
Figure 9:
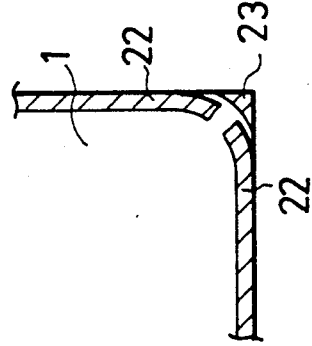

FIGS. 7, 8 and 9 show embodiments of the liquid crystal cells each having a pair of injection holes for the liquid crystal at a corner. In these Figures, the outer seal portions 22, 32 and 42, and the block seal portions 23, 33 and 43 respectively constitute the drains for the sealing agent 6 to pass therethrough, and the sealing structures are nearly the same as shown in FIGS. 6a, 6b and 6c.

FIG. 10 is an embodiment in which a liquid crystal injection hole 54a is installed on the end face around the cell corner of the outer seal portion 52, and another liquid crystal injection hole 54b is drilled at the corner on the cell substrate 1.

FIG. 11 is an embodiment in which a pair of liquid crystal injection holes 60a are provided on the end faces around the cell corner, and another liquid crystal injection hole 60b is drilled at the corner on the cell substrate 1.

FIG. 12 is an embodiment in which a pair of liquid crystal injection holes 74a and 74b are drilled at the corner on the cell substrate 1, the outer seal portion 72 is so arranged as to enclose the substrate 1 in whole and have a pair of waterbreak-like protrusions 72a protruding into the cell more inwardly than the position of the liquid crystal injection holes 74a and 74b.

FIG. 13 is a variation of the embodiment shown in FIG. 12, here the liquid crystal injection opening is transposed. In this embodiment, there is drilled a pair of liquid crystal injection holes 84a and 84b on the cell substrate 1, and the outer seal portion 82 is so arranged as to enclose the substrate 1 in whole and have a pair of waterbreak-like protrusions 82a protruding into the cell more inwardly than the position of the liquid crystal injection holes 84a and 84b.

FIG. 14 is an embodiment in which a liquid crystal injection hole 85 is disposed on the opposite substrate in place of the liquid crystal injection hole 84b in FIG. 13.

Figure 15:
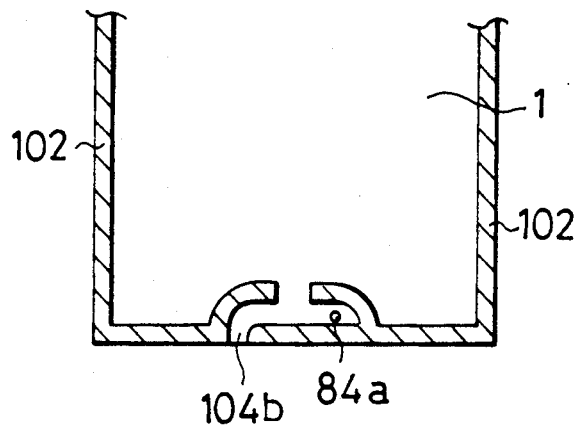

FIG. 15 is an embodiment in which an outer seal portion 102 having a liquid crystal injection hole 104b is adopted in place of the outer seal portion 82 shown in the example of FIG. 14, and another liquid crystal injection hole is drilled on the cell substrate 1.

Figure 16:
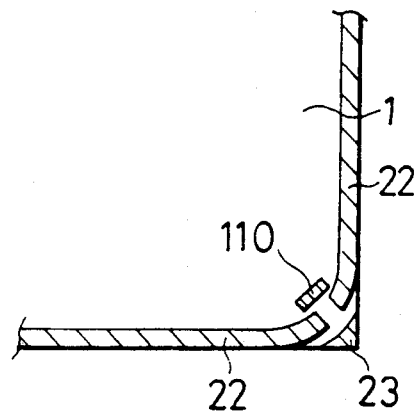
FIG. 16 is a partly diagrammatic sectional view illustrating an embodiment in which a part of the sealant is arranged block-wise within the cell.

FIG. 16 is an embodiment in which there is provided in the cell a sealant block 110 in front of the opening portion formed by the outer seal portion 22, and otherwise is the same as the example of FIG. 7 in which the liquid crystal injection hole is installed at the cell corner. This arrangement makes the sealing agent 6 hard to enter the cell, thus furthermore reducing the influence caused by the injection of the sealing agent 6 upon the gap thickness of the cell.

Figure 17:
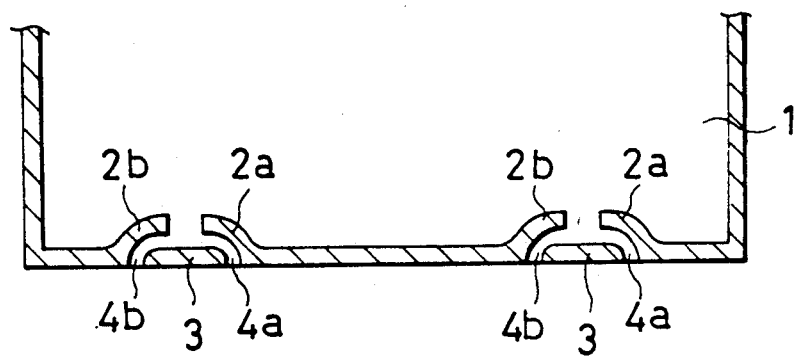
FIG. 17 is a partly diagrammatic sectional view illustrating an embodiment of a liquid crystal display device provided with a pair of sealing structures of liquid crystal injection holes.

FIG. 17 shows an embodiment of the liquid crystal cell in which there are provided a pair of the sealing structures of the liquid crystal injection opening shown in FIGS. 6a, 6b and 6c. As is shown in this example, it is possible in the similar manner to provide a plurality of the same sealing structures of the liquid crystal injection holes for the examples shown from FIG. 7 to FIG. 16. Furthermore, the same effects as indicated for the example of FIGS. 6a, 6b and 6c are obtainable with respect to all the embodiment from FIG. 7 to FIG. 17.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sealing structure of liquid crystal injection holes in a liquid crystal display device, comprising:
   a plurality of liquid crystal injection holes formed by printing a sealant on a substrate for injecting a liquid crystal into a liquid crystal cell inside enclosed by the sealant;
   a drain formed by printing the sealant on the substrate, by which a plurality of said liquid crystal injection holes communicate with each other;
   at least one opening portion formed by printing the sealant on the substrate, by which said drain communicates with said cell inside, said opening portion communicating with a plurality of said injection holes by said drain; and
   a sealing agent injected from one of said injection holes after said injecting of the liquid crystal for sealing a plurality of said injection holes and said drain.

2. A structure according to claim 1, wherein said drain is adapted in such a manner that said sealing agent injected from one of said injection holes can come out of said cell through the other of said injection holes.

3. A structure according to claim 1 or 2, wherein a plurality of said liquid crystal injection holes are formed on an end of said cell, and a sealant block is disposed on an outside of said cell in respect to said opening portion.

4. A structure according to claim 1 or 2, wherein a plurality of said liquid crystal injection holes are formed on an end face of said cell, and a sealant block is disposed on an inside of said cell in front of said opening portion.

5. A structure according to claim 1 or 2, wherein a plurality of said liquid crystal injection holes are disposed on upper and lower substrates of said cell.

6. A structure according to claim 1 or 2, wherein a part of said plurality of liquid crystal injection holes are formed on an end face of said cell, and the rest of said liquid crystal injection holes are disposed on upper and lower substrates of said cell.

7. A structure according to claim 1 or 2, wherein a plurality of said liquid crystal injection holes are adapted in such a manner that the liquid crystal is injected therethrough simultaneously.

* * * * *